(12) United States Patent
Lin et al.

(10) Patent No.: US 8,231,757 B2
(45) Date of Patent: Jul. 31, 2012

(54) METHOD OF MANUFACTURING LAMINATED BAMBOO SLIVER LUMBER

(75) Inventors: Hai Lin, Hangzhou (CN); Xufeng Xu, Zhejiang (CN); Jiuhong Jin, Hangzhou (CN); Hongzheng Liu, Hangzhou (CN)

(73) Assignee: Hangzhou Dazhuang Floor Co., Ltd. (CN)

( * ) Notice: Subject to any disclaimer, the term of this patent is extended or adjusted under 35 U.S.C. 154(b) by 0 days.

(21) Appl. No.: 12/739,014

(22) PCT Filed: Jan. 24, 2008

(86) PCT No.: PCT/CN2008/070176
§ 371 (c)(1),
(2), (4) Date: Apr. 21, 2010

(87) PCT Pub. No.: WO2009/056008
PCT Pub. Date: May 7, 2009

(65) Prior Publication Data
US 2010/0258243 A1    Oct. 14, 2010

(30) Foreign Application Priority Data
Oct. 30, 2007    (CN) .......................... 2007 1 0156195

(51) Int. Cl.
*B32B 37/00*    (2006.01)
*B32B 38/00*    (2006.01)
*B32B 38/04*    (2006.01)
*B32B 38/10*    (2006.01)

(52) U.S. Cl. ........ 156/256; 156/250; 156/252; 156/253; 156/259

(58) Field of Classification Search .............. 156/250, 156/252, 253, 256, 259
See application file for complete search history.

(56) References Cited

U.S. PATENT DOCUMENTS
3,444,732 A * 5/1969 McKinley et al. .......... 73/150 A
(Continued)

FOREIGN PATENT DOCUMENTS
| CN | 1864953 A | 11/2006 |
| CN | 1944011 A | 4/2007 |
| CN | 200960684 Y | 10/2007 |
| WO | 9944796 A1 | 10/1999 |

OTHER PUBLICATIONS
Machine Translation of CN-1944011—Apr. 2007.*
(Continued)

*Primary Examiner* — Mark A Osele
*Assistant Examiner* — Christopher C Caillouet
(74) *Attorney, Agent, or Firm* — Bliss McGlynn, P.C.

(57) ABSTRACT

A method of manufacturing laminated bamboo sliver lumber comprises steps of: preparing bamboo slivers; performing moth-proofing, mildew-proofing, and antiseptic treatments to the bamboo slivers and then drying the bamboo slivers to a moisture content of about 6-15%; machining each dried bamboo sliver to a thickness of about 0.5-3.5 mm (0.02-0.14 in) and a width of about 5-22 mm (0.20-0.87 in) and then dehumidifying the machined bamboo slivers to a moisture content of about 3-10%; applying a glue to the bamboo slivers by glue-coating or "immerging" process, in which a ratio of the glue to an absolute dry weight of the bamboo slivers is about 3-16%; and arranging the glued bamboo slivers with their "width" direction consistent with the "vertical" direction and then pressing the arranged bamboo slivers and curing the glue under a "side" pressure of about 3-15 MPa (0.44-2.18 ksi) and a "top" pressure of about 1-6 MPa (0.15-0.87 ksi) so as to form the laminated bamboo sliver lumber.

10 Claims, 4 Drawing Sheets

U.S. PATENT DOCUMENTS

| | | | | |
|---|---|---|---|---|
| 3,826,701 A | * | 7/1974 | Miller | 156/359 |
| 3,925,139 A | * | 12/1975 | Simmons | 156/358 |
| 5,441,787 A | * | 8/1995 | Fujii et al. | 428/57 |
| 5,967,207 A | * | 10/1999 | Chen | 144/345 |
| 5,972,467 A | | 10/1999 | Washo | |
| 5,976,644 A | * | 11/1999 | Sanaee et al. | 428/17 |
| 6,722,093 B2 | * | 4/2004 | Dauplay | 52/314 |

OTHER PUBLICATIONS

Machine Translation of CN-200960684—Oct. 2007.*

Machine Translation of CN-1864953—Nov. 2006.*

* cited by examiner

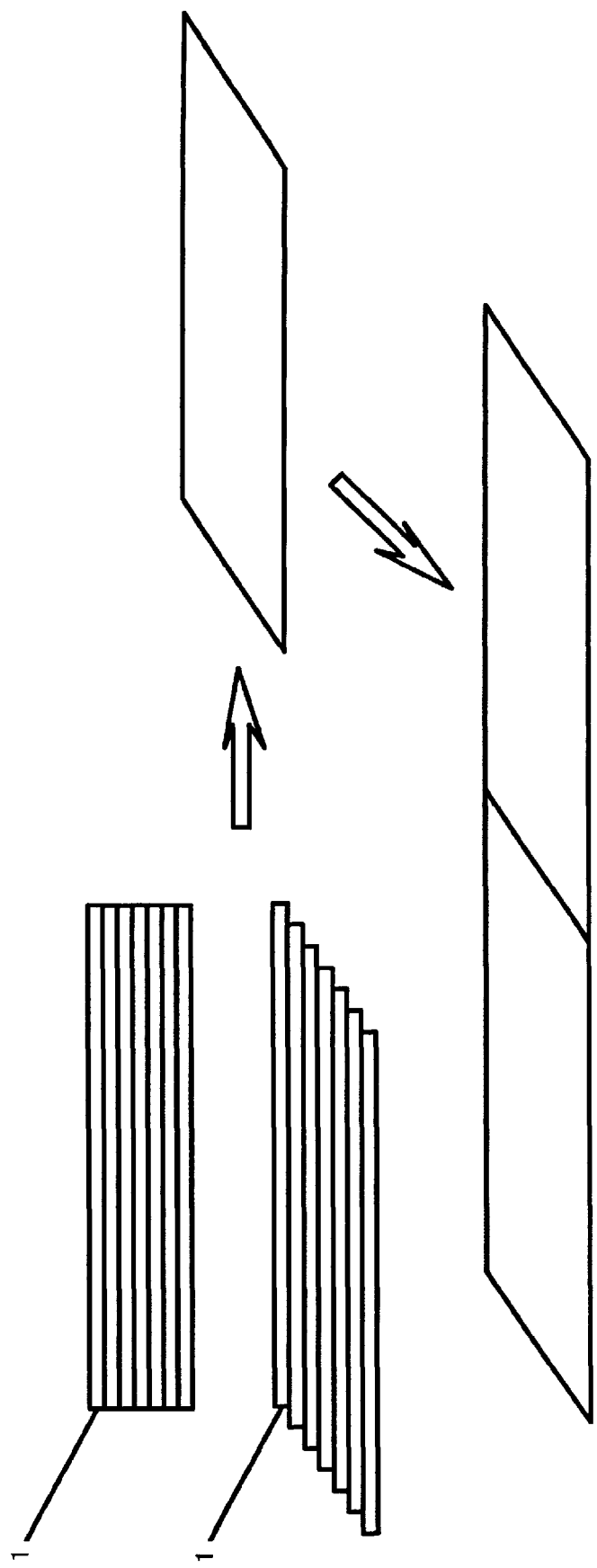

METHOD OF MANUFACTURING LAMINATED BAMBOO SLIVER LUMBER

CROSS-REFERENCE TO RELATED APPLICATIONS

This application claims priority to and benefit of the filing date of PCT Patent Application PCT/CN2008/070176 entitled "Method of Manufacturing Laminated Bamboo Sliver Lumber" and filed on Jan. 24, 2008, which, in turn, claims priority to and benefit of the filing date of Chinese Patent Application 200710156195.9 entitled "Method of Manufacturing Laminated Bamboo Sliver Lumber" and filed on Oct. 30, 2007.

BACKGROUND OF THE INVENTION

1. Field of the Invention

The present invention generally relates to a method of manufacturing a laminated lumber, more particularly, to a method of manufacturing laminated bamboo sliver lumber.

2. Description of the Related Art

With ecology environment being continuously destroyed, environmental protection becomes more important in the world, and forest cutting is restricted in many countries. Bamboo grows very rapidly and can generally be used after four years' growth whereas a tree has to be grown for more than 10 years before final commercial use. In addition, bamboos are hard in texture and high in strength and rigidity.

Conventional blades for wind electric power generation are generally manufactured by a composite material of glass fiber reinforced with plastic and epoxy resin. When the blade is longer than 30 m [32.81 yd (this English-equivalent measurement and those hereinafter being rounded to the nearest hundredth)], the carbon fiber is added to the composite material in order to increase the strength and rigidity of the blade. However, the carbon fiber is very expensive, and with the development of the aerospace industry has become in high demand making it more expensive. Moreover, conventional blades are heavy and expensive, and the requirements for the matching materials are high.

Therefore, it is proposed to use laminated bamboo sliver lumber manufactured by bamboo slivers to substitute the composite material for the blades for wind electric power generation, or used for architecture as well as in the aerospace field, such that the consumption of forest will be decreased, and the manufacturing cost can be decreased accordingly. However, there are some problems with the conventional laminated bamboo sliver lumbers concerning the strength and mechanical property.

SUMMARY OF THE INVENTION

The present invention is directed to solve at least one of the problems existing in the prior art. Accordingly, an object of the present invention is to provide a method of manufacturing laminated bamboo sliver lumber which is high in strength, excellent in mechanical property and light in weight with low manufacturing cost. The method comprises steps of preparing bamboo slivers, including providing a bamboo that is more than about 4 years of age and has an outer diameter of about 23-50 cm (9.06-19.69 in), cutting the bamboo at about 0.5 m (1.64 ft) from a root of the bamboo so as to obtain a bamboo stem of a certain length, cutting the bamboo stem along a radial direction thereof into bamboo tubes each having a length of about 0.3-2.6 m (0.98-8.53 ft), splitting each bamboo tube along an axial direction thereof into bamboo strips each having a width of about 8-25 mm (0.31-0.98 in), sectioning each bamboo strip into a bamboo inner skin sliver and a bamboo outer sliver including bamboo outer skin and having an air dry density no less than about 0.95 g/cm$^3$ (59.31 lb/ft$^3$), and selecting and using the bamboo outer slivers and removing siliceous and wax layers on an outer surface of each bamboo outer sliver so as to obtain bamboo slivers each having a thickness of about 1-4 mm (0.04-0.16 in). The method comprises further steps of performing moth-proofing, mildew-proofing, and antiseptic treatments to the bamboo slivers and then drying the bamboo slivers to a moisture content of about 6-15%; machining each dried bamboo sliver to a thickness of about 0.5-3.5 mm (0.02-0.14 in) and a width of about 5-22 mm (0.20-0.87 in) and then dehumidifying the machined bamboo slivers to a moisture content of about 3-10%; applying a glue to the bamboo slivers by glue-coating or "immerging" process, in which a ratio of the glue to an absolute dry weight of the bamboo slivers is about 3-16%; and arranging the glued bamboo slivers with their "width" direction consistent with the "vertical" direction and then pressing the arranged bamboo slivers and curing the glue under a "side" pressure of about 3-15 MPa (0.44-2.18 ksi) and a "top" pressure of about 1-6 MPa (0.15-0.87 ksi) so as to form the laminated bamboo sliver lumber.

The method of manufacturing laminated bamboo sliver lumber according to the present invention involves an efficient process, and the manufactured laminated bamboo sliver lumber has a tensile strength parallel to grain greater than 220 MPa (31.91 ksi), a compressive strength parallel to grain greater than 120 MPa (17.40 ksi) and an elastic modulus greater than 22 GPa (3,190.83 ksi). The laminated bamboo sliver lumber has high-strength mechanical property, is low in cost and light in weight. The laminated bamboo sliver lumber meets the requirements for manufacturing the blades for wind electric power generation, and the requirements for the matching materials are low, so that the overall cost is reduced accordingly. Further, the laminated bamboo sliver lumber can be degraded while saving energy and being environment-friendly. The laminated bamboo sliver lumber can also be used for architecture as well as in the aerospace field and shipbuilding industry.

BRIEF DESCRIPTION OF THE DRAWINGS

FIG. 6 shows a flow chart of splicing laminated bamboo sliver lumbers in a longitudinal direction thereof.

DETAILED DESCRIPTION OF EMBODIMENTS OF THE INVENTION

Figure 1:
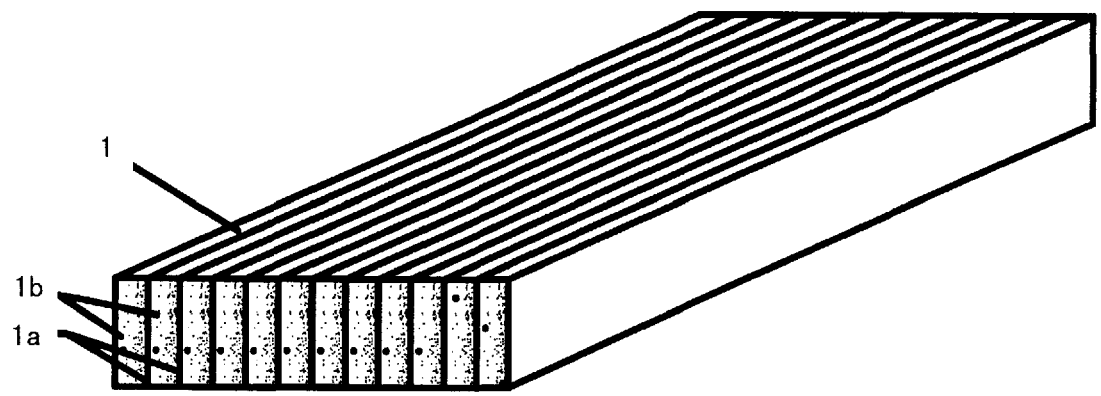
FIG. 1 is a representative perspective view illustrating the bamboo slivers disposed in side-by-side relation with the outer surface oriented to face the inner surface of the adjacent bamboo sliver.

Embodiments of the method of manufacturing laminated bamboo sliver lumber according to embodiments of the present invention will be described below. As shown throughout the figures, the present invention employs a plurality of bamboo slivers 1 that may be arranged in different manners with respect to each other. Each bamboo sliver 1 includes an outer surface 1a and an inner surface 1b. With this description in mind, the method of manufacturing the laminated bamboo sliver lumber will now be described.

The method of manufacturing laminated bamboo sliver lumber according to an embodiment of the present invention may comprise the following steps:

1) Preparing of the Bamboo Silvers

A bamboo, such as Mao bamboo, which may be more than about 4 years of age and may have an outer diameter of about 23-50 cm (9.06-19.69 in) is selected and used.

The bamboo is cut by using a circular sawing machine, in which a segment of the bamboo having a length of about 0.5 m (1.64 ft) from the root of the bamboo is cut off so as to obtain a bamboo stem.

The bamboo stem is cut along a radial direction thereof into bamboo tubes each having a length of about 0.3-2.6 m (0.98-8.53 ft).

Each bamboo tube is split along an axial direction thereof into bamboo strips each having a width of about 8-25 mm (0.31-0.98 in).

Each bamboo strip is sectioned manually or by using a bamboo strip slicing machine into two layers: a bamboo outer sliver and a bamboo inner sliver.

The bamboo outer sliver having an air dry density no less than about 0.95 g/cm3 (59.31 lb/ft$^3$) is selected and used, and siliceous and wax layers on an outer surface of the bamboo outer sliver is removed, then the bamboo outer sliver is processed to obtain bamboo sliver having a width of about 1-4 mm (0.04-0.16 in).

Alternatively, after the bamboo tube is split along its axial direction into bamboo strips, each bamboo strip is sectioned into three layers: the bamboo outer sliver having an air dry density no less than about 0.95 g/cm3 (59.31 lb/ft$^3$), the bamboo inner sliver and an intermediate sliver therebetween. Then the intermediate sliver is consolidated to have an air dry density no less than about 0.95 g/cm3 (59.31 lb/ft$^3$). The bamboo outer sliver and the consolidated layer are selected and used as bamboo slivers to manufacture the laminated bamboo sliver lumber.

Because the selected and used bamboo slivers have an air dry density no less than about 0.95 g/cm3 (59.31 lb/ft$^3$), the laminated bamboo sliver lumber manufactured by using the bamboo slivers may have such strength and mechanical property which meet the requirements for manufacturing the blades for wind electric power generation.

2) Performing of Mothproofing, Mildew Proofing and Antiseptic Treatments

The bamboo slivers may be subject to mothproofing, mildew proofing and antiseptic treatments. Then the bamboo slivers are dried to a moisture content of about 6-15%. The bamboo strip drying apparatus employs a kiln drying room, in which the temperature is controlled to about 40-70. Alternatively, the bamboo slivers are dried under a constant temperature and in a constant humidity room in which the relative moisture content is about 6-15%. In a still alternative embodiment, the bamboo slivers are dried in a roller drier or a wire belt drier in which the temperature is controlled to about 80-120.

3) Machining of Dried Bamboo Slivers

The dried bamboo slivers is machined to a thickness of about 0.5-3.5 mm (0.02-0.14 in) and a width of about 5-22 mm (0.20-0.87 in). Then the machined bamboo slivers are dehumidified to a moisture content of about 3-10%. In some embodiments, the dried bamboo slivers are machined to a thickness of about 0.8-1.5 mm (0.03-0.06 in) and a width of about 12-18 mm (0.47-0.71 in). Then the machined bamboo slivers are dehumidified to a moisture content of about 5-8%.

4) Applying of Glue

The bamboo slivers are applied with glue via glue coating or immerging process, in which a ratio of the glue to an absolute dry weight of the bamboo slivers is about 3-16%, preferably about 5-8%. The glue can be one or more selected from a group consisting of modified urea-formaldehyde resin, melamine resin, isocyanic acid tallow emulsion, poly vinyl acetate emulsion, phenolic resin, modified phenolic resin, resorcinol resin, epoxy resin, and polyurethane.

5) Arranging of Glued Bamboo Slivers

The glued bamboo slivers are arranged with their width direction consistent with the vertical direction, then the arranged bamboo slivers are pressed and the glue is cured under a side pressure of about 3-15 MPa (0.44-2.18 ksi) and a top pressure of about 1-6 MPa (0.15-0.87 ksi) so as to form the laminated bamboo sliver lumber. In some embodiments, the side pressure is about 3-8 MPa (0.44-1.16 ksi) and the top pressure is about 2-4 MPa (0.29-0.58 ksi). The obtained laminated bamboo sliver lumber is dehumidified to a moisture content of about 3-10%, more particularly, about 3-7%.

Figure 2:
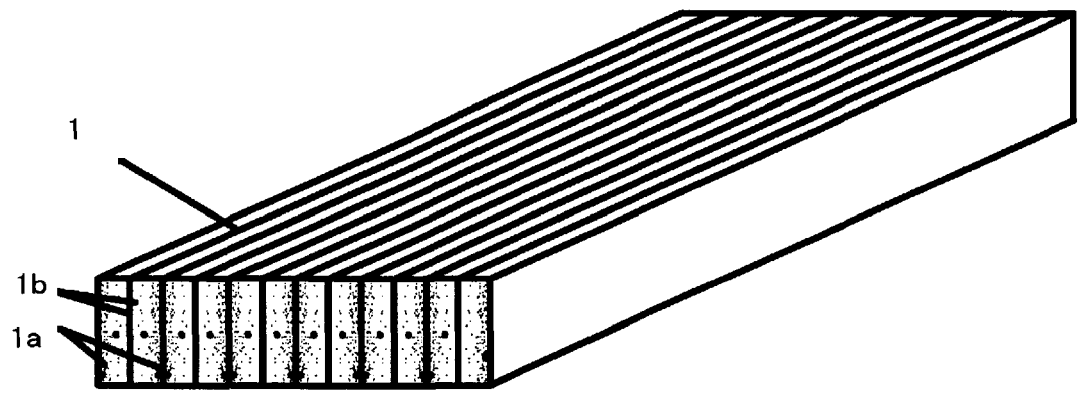
FIG. 2 is a representative perspective view showing the bamboo slivers arranged in side-by-side relationship such that the outer surface of two adjacent bamboo slivers are disposed in abutting face-to-face relationship and the inner surface of two adjacent bamboo slivers are disposed in abutting face-to-face relationship.
Figure 3:
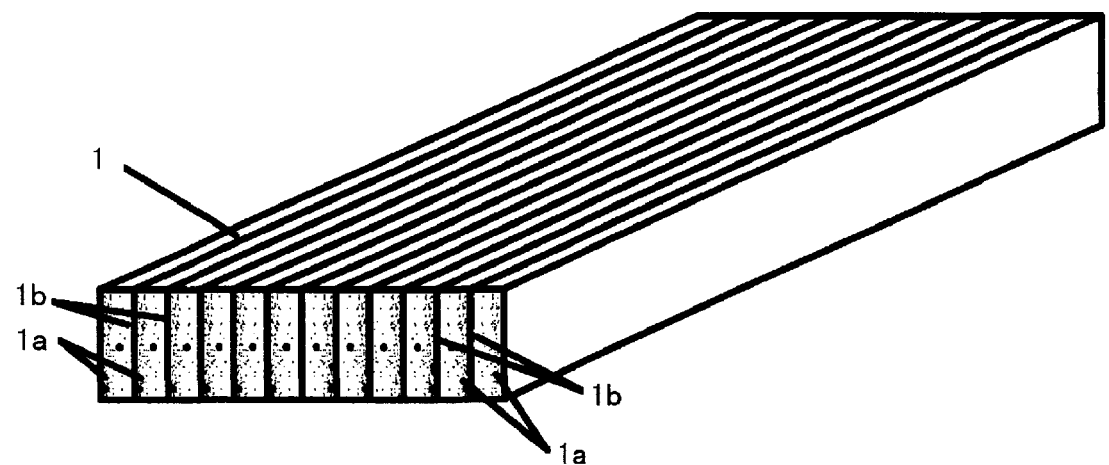
FIG. 3 is a representative perspective view showing the bamboo slivers arranged so as to define a first group and a second group divided by and axis of symmetry where the outer surfaces of the bamboo slivers in the first group are oriented to face the same direction and the outer surface of the bamboo slivers in the second group are arranged to face the same direction but that is opposite to the first direction.
Figure 4:
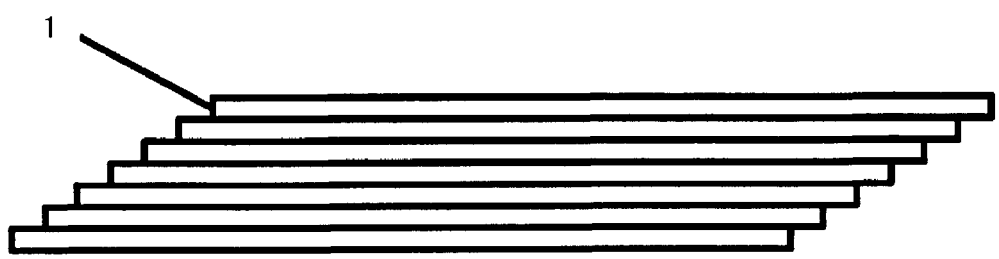
FIG. 4 is a top plan view illustrating the bamboo slivers disposed such that the ends of the bamboo slivers are staggered in the longitudinal direction.

As shown in FIGS. 1-4, the bamboo slivers can be arranged with their width direction consistent with the vertical direction in the following manners: in FIG. 1, the bamboo slivers 1 are shown with the outer surfaces 1a and the inner surfaces 1b of the bamboo slivers 1 oriented to face the same directions respectively. In FIG. 2, the bamboo slivers 1 are shown with the outer surfaces 1a of two adjacent bamboo slivers 1 clung to each other and the inner surfaces 1b of two adjacent bamboo slivers 1 clung to each other too. In FIG. 3, the bamboo slivers 1 are shown with the bamboo slivers 1 divided into a first group and a second group by an axis of symmetry, in which outer surfaces 1a of the bamboo slivers 1 in the first group are oriented to face the same first direction, outer surfaces 1a of the bamboo slivers 1 in the second group are oriented to face the same second direction opposite to the first direction, that is, the outer surfaces 1a or the inner surfaces 1b of the arranged bamboo slivers 1 in both the first and the second group all face to the axis of symmetry. In FIG. 4, the bamboo slivers are shown with the ends of the bamboo slivers 1 staggered in the longitudinal direction thereof such that the laminated bamboo sliver lumber has two stepped ends.

Figure 5:
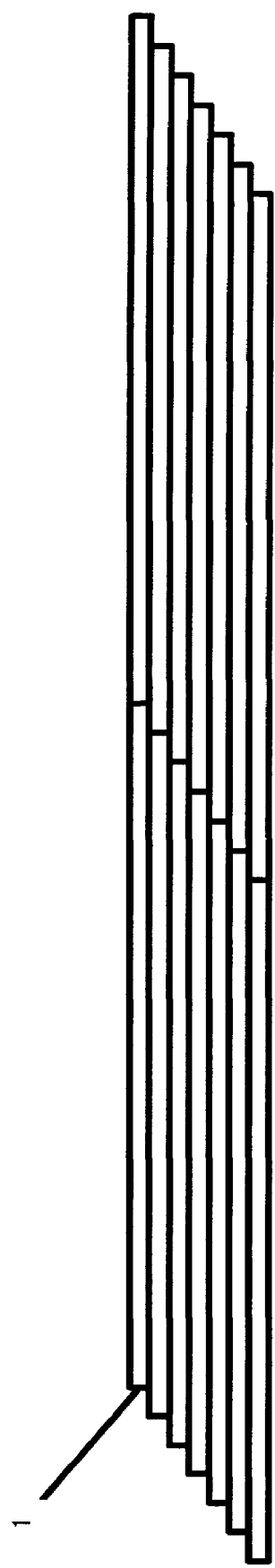
FIG. 5 shows a schematic view showing two laminated bamboo sliver lumbers spliced together in a longitudinal direction thereof.

As shown in FIGS. 5 and 6, two adjacent laminated bamboo sliver lumbers can spliced at their ends in the following manners. The bamboo slivers 1 are arranged in the manner as shown in FIG. 4. Then ends of two adjacent laminated bamboo sliver lumbers manufactured are spliced together to form a spliced laminated bamboo sliver lumber having a desired length. Where the bamboo slivers are arranged in the manner shown in FIGS. 1-3, then the manufactured laminated bamboo sliver lumber is machined to have two inclined end surfaces, and the inclined end surfaces of two adjacent laminated bamboo sliver lumbers are spliced together so as to form a spliced laminated bamboo sliver lumber having a desired length. By splicing the inclined end surfaces of adjacent laminated bamboo sliver lumbers, the consumption of the material can be reduced to a great extent.

With the method of the embodiments of the present invention, the mechanical property of the manufactured laminated bamboo sliver lumber can be improved. Some performance parameters of the laminated bamboo sliver lumber manufactured by the method of the embodiments of the present invention and the comparative examples are given in the follow table:

| Material | Tensile Strength | | Compressive Strength | | Elastic Modulus | |
|---|---|---|---|---|---|---|
| | (MPa) | (ksi) | (MPa) | (ksi) | (GPa) | (ksi) |
| laminated bamboo sliver lumber | 252 | 36.55 | 120 | 17.40 | 24 | 3,480.90 |
| Bamboo floor | 127 | 18.42 | 70 | 10.15 | 13 | 1,885.49 |
| laminated birch sliver lumber | 104 | 15.08 | 75 | 10.88 | 17 | 2,465.64 |

The method of manufacturing laminated bamboo sliver lumber according to the present invention involves an efficient process, and the manufactured laminated bamboo sliver lumber has a tensile strength parallel to grain greater than 220 MPa (31.91 ksi), a compressive strength parallel to grain greater than 120 MPa (17.40 ksi) and an elastic modulus greater than 22 GPa (3,190.83 ksi). The laminated bamboo sliver lumber has high-strength mechanical property, is low in cost and light in weight. The laminated bamboo sliver lumber meets the requirements for manufacturing the blades for wind electric power generation, and the requirements for the matching materials are low, so that the overall cost is reduced accordingly. Further, the laminated bamboo sliver lumber can be degraded while saving energy and being environment-friendly. The laminated bamboo sliver lumber can also be used for architecture as well as in the aerospace field and shipbuilding industry.

The present invention has been described in an illustrative manner. It is to be understood that the terminology that has been used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. A method of manufacturing laminated bamboo sliver lumber, comprising steps of:
   a) preparing bamboo slivers, including:
      providing a bamboo which is more than about 4 years of age and has an outer diameter of about 23-50 cm (9.06-19.69 in),
      cutting the bamboo at about 0.5 m (1.64 ft) from a root of the bamboo so as to obtain a bamboo stem of a certain length,
      cutting the bamboo stem along a radial direction thereof into bamboo tubes each having a length of about 0.3-2.6 m (0.98-8.53 ft),
      splitting each bamboo tube along an axial direction thereof into bamboo strips each having a width of about 8-25 mm (0.31-0.98 in),
      sectioning each bamboo strip into a bamboo inner skin sliver and a bamboo outer sliver including bamboo outer skin and having an air dry density no less than about 0.95 g/cm$^3$ (59.31 lb/ft$^3$), and
      selecting and using the bamboo outer slivers and removing siliceous and wax layers on an outer surface of each bamboo outer sliver so as to obtain bamboo slivers each having a thickness of about 1-4 mm (0.04-0.16 in);
   b) performing mothproofing, mildew proofing and antiseptic treatments to the bamboo slivers, then drying the bamboo slivers to a moisture content of about 6-15%;
   c) machining each dried bamboo sliver to a thickness of about 0.5-3.5 mm (0.02-0.14 in) and a width of about 5-22 mm (0.20-0.87 in), then dehumidifying the machined bamboo slivers to a moisture content of about 3-10%;
   d) applying a glue to the bamboo slivers by glue coating or immerging process, in which a ratio of the glue to an absolute dry weight of the bamboo slivers is about 3-16%; and
   e) arranging the glued bamboo slivers with their width direction consistent with the vertical direction, then pressing the arranged bamboo slivers and curing the glue under a side pressure of about 3-15 MPa (0.44-2.18 ksi) and a top pressure of about 1-6 MPa (0.15-0.87 ksi) so as to form the laminated bamboo sliver lumber.

2. The method of manufacturing laminated bamboo sliver lumber according to claim 1, wherein each bamboo strip is sectioned into a bamboo outer sliver including bamboo outer skin, a bamboo inner sliver, and an intermediate sliver therebetween, then the intermediate sliver is consolidated to have an air dry density no less than about 0.95 g/cm3 (59.31 lb/ft$^3$), and the bamboo outer sliver and the consolidated layer are selected and used as bamboo slivers.

3. The method of manufacturing laminated bamboo sliver lumber according to claim 1, wherein outer surfaces of the arranged bamboo slivers are oriented to face the same direction.

4. The method of manufacturing laminated bamboo sliver lumber according to claim 1, wherein outer surfaces of two arranged adjacent bamboo slivers are oriented to face opposite directions.

5. The method of manufacturing laminated bamboo sliver lumber according to claim 1, wherein the arranged bamboo slivers are divided into a first group and a second group by an axis of symmetry thereof, in which outer surfaces of the arranged bamboo slivers in the first group are oriented to face the same first direction, outer surfaces of the arranged bamboo slivers in the second group are oriented to face the same second direction opposite to the first direction.

6. The method of manufacturing laminated bamboo sliver lumber according to claim 1, wherein the glued bamboo slivers are arranged with their ends being staggered such that the laminated bamboo sliver lumber has two stepped ends, thereby two adjacent laminated bamboo sliver lumbers can spliced at their ends so as to form a spliced laminated bamboo sliver lumber having a desired length.

7. The method of manufacturing laminated bamboo sliver lumber according to claim 1, the laminated bamboo sliver lumber is machined to have two inclined end surfaces, so that the inclined end surfaces of two adjacent laminated bamboo sliver lumbers can be spliced to form a spliced laminated bamboo sliver lumber having a desired length.

8. The method of manufacturing laminated bamboo sliver lumber according to claim 1, wherein the laminated bamboo sliver lumber is dehumidified to a moisture content of about 3-10%, preferably about 3-10%.

9. The method of manufacturing laminated bamboo sliver lumber according to claim 1, wherein the dried bamboo slivers are machined to a thickness of about 0.8-1.5 mm (0.03-0.06 in) and a width of about 12-18 mm (0.47-0.71 in), and the ratio of the glue to an absolute dry weight of the bamboo slivers is about 5-8%.

10. The method of manufacturing laminated bamboo sliver lumber according to claim 1, wherein the side pressure is about 3-8 MPa (0.44-1.16 ksi) and the top pressure is about 2-4 MPa (0.29-0.58 ksi).

* * * * *